Figure 1:
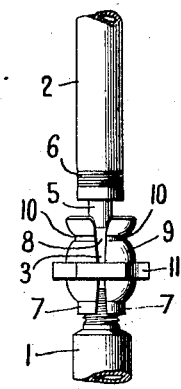

C. J. LARKIN.
COUPLING.
APPLICATION FILED JAN. 13, 1913.

1,109,767.

Patented Sept. 8, 1914.

Fig.8.

Witnesses.
Thomas J. Drummond.
Joseph D. Ashe.

Inventor.
Clifford J. Larkin
by Edwards Hasdie Smith
Atty's.

UNITED STATES PATENT OFFICE.

CLIFFORD J. LARKIN, OF EVERETT, MASSACHUSETTS.

COUPLING.

1,109,767. Specification of Letters Patent. Patented Sept. 8, 1914.

Application filed January 13, 1913. Serial No. 741,714.

*To all whom it may concern:*

Be it known that I, CLIFFORD J. LARKIN, a citizen of the United States, residing at Everett, county of Middlesex, State of Massachusetts, have invented an Improvement in Couplings, of which the following description, in connection with the accompanying drawing, is a specification, like characters on the drawing representing like parts.

This invention relates to couplings of that type which permits the two pipe sections to be coupled together merely by a movement toward each other in the direction of the axis of the coupling, and the object of the invention is to provide a novel coupling of this type which can be inexpensively manufactured and which is effective in operation.

In order to illustrate the invention I have herein shown it as it might be applied in a tire connector, that is, in a coupling for connecting the pipe of an air pump to the valve stem of a pneumatic tire. I wish to state, however, that may invention is not limited to this particular use, but would be adapted for coupling any two pipe sections together.

Figure 7:
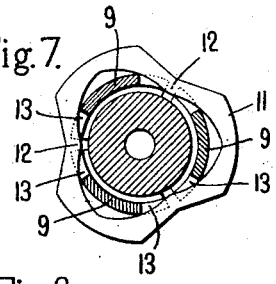
Figure 2:
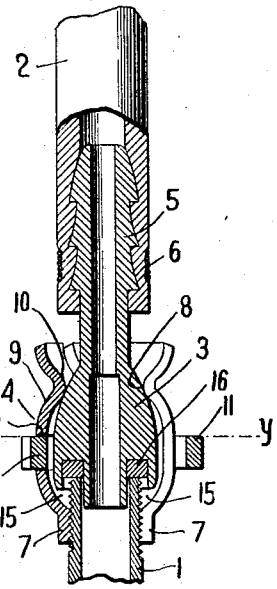
Figure 3:
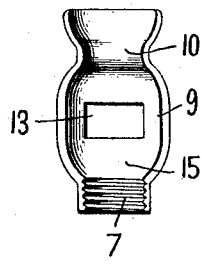
Figure 4:
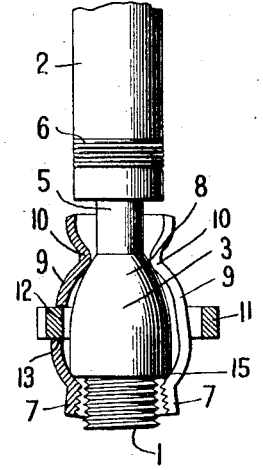
Figure 6:
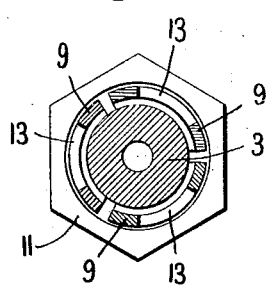
Figure 5:
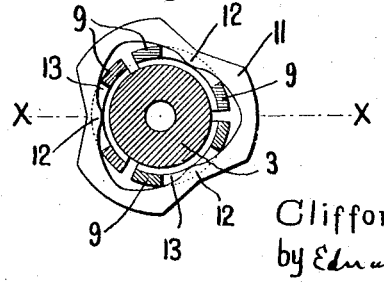

Referring to the drawings wherein I have illustrated some embodiments of my invention, Figure 1 is an elevation of a coupling embodying my invention; Fig. 2 is a sectional view through the coupling taken on the line $x$—$x$, Fig. 5; Fig. 3 is a detail view of one of the sections of the coupling member; Fig. 4 is a view partly in section showing the manner of coupling the two pipe sections together; Fig. 5 is a section on the line $y$—$y$, Fig. 2; Fig. 6 is a sectional view similar to Fig. 5, but showing the way in which the parts are assembled in the manufacture of the coupling; Fig. 7 is a view similar to Fig. 5 showing a different embodiment of my invention; Fig. 8 is a view similar to Fig. 3 showing one of the coupling member sections illustrated in Fig. 7.

My improved coupling comprises a body member which is adapted to engage the end of one of the pipe sections to be coupled and a coupling member which encircles the body member and has a slight movement longitudinally thereof, said coupling member and body member having such a construction that this longitudinal movement causes the pipe-engaging portion of the coupling member to expand or contract.

In the drawings 1 designates one of the pipe sections that are to be coupled and 2 the other pipe section. These two pipe sections might be of any construction for any use, but as herein shown the pipe section 1 is the valve stem of a pneumatic tire and the pipe section 2 is the pipe leading from the pump.

My improved coupling comprises a body member 3 and a coupling member designated generally by 4. The body member is connected to the pipe section 2 in any suitable way, that depending on the nature of the pipe section. Where the pipe section 2 is a rubber or flexible hose member the body 3 may have the nipple 5 provided with the serrated surface which is inserted into the pipe section 2, said nipple being secured to the pipe section 2 by a binding wire 6. However, the body member 3 might be screwed to the pipe section 2 if the latter were a metal pipe section, or fastened thereto in any other way without departing from the invention.

The pipe section 1 is screw-threaded and the coupling member 4 is provided with expansible screw-threaded jaws adapted to engage the screw-threads of the pipe section 1. In the embodiment of the invention herein shown the pipe section 1 is exteriorly screw-threaded, and, therefore, constitutes the male member, and the jaws of the coupling member are interiorly screw-threaded so that the latter constitute the female member. These interiorly screw-threaded jaws are designated by 7 and there may be any desired number of them. I have herein shown three, although the number is not important.

To provide for opening and closing the jaws 7 the coupling member 4 and the body 3 are each of special construction, that is, the body 3 has a tapering portion 8 and the coupling member encircles the body portion and is capable of movement longitudinally thereof, and also has such a construction that this longitudinal movement will effect the opening and closing of the jaws 7. The coupling member is divided longitudinally into a plurality of sections 9, there being as many sections as there are jaws 7. Each section 9 is shown as having the central portion of larger diameter and the two end portions 7 and 10 of smaller diameter, the end portion 7 constituting the pipe-engaging jaw (which in this embodiment of the invention is a screw-threaded jaw) and the end portion 10 constituting the part which co-acts with the tapered portion 8 of the body to effect the closing of the jaws. The sections of the coupling member can readily be made of sheet metal pressed into the desired shape, although this method of manufacture is not essential. The coupling member sections are held in position by means of a retaining ring 11 which surrounds them and has an interlocking engagement with them which permits each of them to rock about a transverse axis. One simple way of connecting the retaining ring to the sections of the coupling member is to provide the enlarged portion 9 of each member with an opening or openings, and to provide the retaining ring with indented portions 12 to enter these openings. In Fig. 5 each coupling section 9 is provided with a central opening 13 to receive the indented portion 12 of the retaining ring. In Figs. 7 and 8 I have shown a construction wherein each coupling member section is provided at each end with an opening 13 to receive the indented portion 12 of the retaining ring. In this embodiment each indented portion 12 enters the opening 13 in the adjacent edges of two coupling member sections 9.

The relative size of the coupling member and the body member 3 are such as to permit a slight longitudinal movement of the coupling member on the body member, and when the coupling member is moved toward the end of the body member the engagement of the tapered portion 8 thereof with the contracted portion 10 of the coupling member causes the sections of the coupling member to rock in a direction to close the jaws 7 together while a movement of the coupling member in an opposite direction on the body member brings the end of the body member against the inclined faces 15 on the front end of the coupling member sections 9 and thereby opens the jaws, as shown in Fig. 4.

To connect the pipe 2 to the valve stem 1 the operator grasps the retaining ring 11 and draws the coupling member backwardly on the body member 3, as shown in Fig. 4. This opens the jaws 7 so as to permit the screw-threaded portion of the pipe section 1 to enter said jaws, as seen in Fig. 4.

The body member 2 is preferably provided with a gasket 16 against which the end of the pipe section 1 seats to make a tight joint. When the body member and pipe section are in proper position, as shown in Fig. 4, the coupling member is moved toward the end of the body member, and in so doing the engagement of the tapered portion 8 of the body member with the contracted portion 10 of the coupling member rocks the coupling member sections 9 thereby closing the jaws 7 onto the pipe section 1, as shown in Fig. 2. The coupling can then be tightened and made perfectly air tight by simply turning the coupling member sections slightly on the body member. A partial turn is sufficient for this purpose. The act of coupling the pipe 2 to the valve stem 1, therefore, merely involves inserting the coupling member over the valve stem, and in performing this act the coupling member is naturally given a movement longitudinally of the body sufficient to close the jaws onto the pipe, and then giving the coupling member a partial turn.

In the embodiment of the invention herein illustrated the pipe-engaging jaws are screw-threaded to fit the screw-threads of the pipe section 1. It is to be understood, however, that it is not essential that the pipe-engaging jaws should be screw-threaded, as they may have any suitable construction adapted to grip the pipe section 1.

I have herein referred to the part 3 as a body member which is secured to a pipe section 2, but this part 3 might be considered as a pipe section for it is obvious that the end of one of the pipe sections to be connected together might be made with the tapered portion 8 and be otherwise constructed to operate within the coupling member. Hence when I refer to a "body member" in the appended claims I intend to cover the invention whether said body member be considered as one of the pipe sections or as a separate element that is connected to one of the pipe sections.

In order to facilitate the assembling of the parts I propose to make the retaining ring 11 with an interior diameter slightly greater than the exterior diameter of the coupling member so that said retaining ring can be slipped over the coupling member as shown in Fig. 6. When this is done the retaining ring is indented at points opposite the openings 13 thereby to provide the portions 12 which enter the openings 13. This indenting of the coupling ring can be easily done in a suitable press or in any other appropriate way.

While I have illustrated some embodiments of my invention, from which the principle thereof will be evident, yet I desire to state that the numerous changes in constructional features may be made without departing from the invention.

Having fully described my invention, what I claim as new and desire to secure by Letters Patent is:—

1. In a coupling, the combination with a coupling member divided longitudinally into a plurality of sections and provided at one end with pipe-engaging jaws, of a body member having a portion situated within the coupling member and capable of a slight longitudinal movement therein, said coupling and body members having such a relative shape that such longitudinal movement will cause the coupling member sections to rock in two directions about transverse axes thereby to move the jaws radially.

2. In a coupling, the combination with a body member having tapering portions, of a coupling member encircling said tapering portions and provided at one end with pipe engaging jaws, said coupling member being divided longitudinally into a plurality of sections and capable of a slight movement longitudinally of the body member, the tapering portions of the body member acting during such movement to rock the coupling member sections movement in one direction operating to open the jaws and movement in the opposite direction operating to close the jaws.

3. In a coupling, the combination with a body member of a coupling member encircling the body member and capable of slight longitudinal movement, said coupling member having pipe engaging jaws, the aforesaid parts being so shaped that movement in one direction will open the jaws, and movement in the other direction will close the jaws.

4. A coupling comprising a body member, a coupling member surrounding the body member and divided to present a plurality of separate coupling member sections, each having an opening and a common retaining member encircling the coupling member and having portions to enter said openings, said retaining member holding the coupling member sections in position relative to each other and in position on the body member, and said body and coupling member sections having such shape relative to each other that relative longitudinal movement of the body and coupling members causes the coupling member sections to rock.

5. In a coupling, the combination with the body member, of a coupling member encircling the body member and divided longitudinally into a plurality of sections, each having a pipe engaging jaw, a retaining member encircling the coupling member sections and held from longitudinal movement relative thereto and holding them in proper relative position while permitting rocking movement thereof, said parts having such a shape that relative longitudinal movement will cause a radial movement of the pipe engaging jaws.

6. A coupling comprising coupling member sections, concave in longitudinal cross section, means connecting the sections, a body member substantially filling the space between the coupling member sections and capable of slight longitudinal movement therein, said body member and sections having such relative shape that longitudinal movement of the body member will rock the sections.

7. A coupling comprising coupling member sections concave in longitudinal cross sections, means connecting the sections to hold them in place but permit rocking movement thereof and a body member substantially filling the space between the coupling member sections and capable of slight longitudinal movement therein to control the rocking movement of the sections.

In testimony whereof, I have signed my name to this specification, in the presence of two subscribing witnesses.

CLIFFORD J. LARKIN.

Witnesses:
LOUIS C. SMITH,
THOMAS J. DRUMMOND.

---

Copies of this patent may be obtained for five cents each, by addressing the "Commissioner of Patents, Washington, D. C."